(12) United States Patent
Tomoda et al.

(10) Patent No.: US 8,499,795 B2
(45) Date of Patent: Aug. 6, 2013

(54) SOLENOID VALVE DEVICE

(75) Inventors: Shinichiro Tomoda, Miyagi (JP);
Shigeto Ryuen, Miyagi (JP); Shunsuke Yoshida, Saitama (JP); Isamu Shinbori, Saitama (JP); Yoshimichi Tsubata, Saitama (JP); Kenji Suda, Miyagi (JP); Syu Murayama, Miyagi (JP)

(73) Assignees: Keihin Corporation, Shioya-gun, Tochigi (JP); Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 12/951,648

(22) Filed: Nov. 22, 2010

(65) Prior Publication Data
US 2011/0168930 A1 Jul. 14, 2011

(30) Foreign Application Priority Data

Nov. 24, 2009 (JP) ................................. 2009-266472
Nov. 24, 2009 (JP) ................................. 2009-266473

(51) Int. Cl.
*F16K 11/24* (2006.01)
(52) U.S. Cl.
USPC ......................................... 137/884; 477/127
(58) Field of Classification Search
USPC ......................................... 137/884; 477/127
See application file for complete search history.

(56) References Cited

U.S. PATENT DOCUMENTS

| 4,449,426 A | * | 5/1984 | Younger ........................ 477/127 |
| 6,076,556 A | * | 6/2000 | Fuchs et al. .................... 137/884 |
| 6,155,137 A | * | 12/2000 | Nassar et al. ................ 74/606 R |
| 6,827,106 B2 | * | 12/2004 | Hori et al. ...................... 137/884 |
| 6,892,762 B2 | * | 5/2005 | Porter et al. .................. 137/884 |
| 6,913,037 B2 | * | 7/2005 | Miyazoe et al. .............. 137/557 |
| 6,971,272 B2 | * | 12/2005 | Forster et al. .............. 73/861.74 |

FOREIGN PATENT DOCUMENTS

| JP | 2001-124231 A | 5/2001 |
| JP | 2005-325891 A | 11/2005 |
| JP | 2006-097727 A | 4/2006 |

OTHER PUBLICATIONS

Japanese Office Action dated May 14, 2013, issued in corresponding Japanese Patent Application No. 2009-266472 (2 pp).

* cited by examiner

*Primary Examiner* — John Fox
(74) *Attorney, Agent, or Firm* — Westerman, Hattori, Daniels & Adrian, LLP

(57) ABSTRACT

An integrated body comprises an upper body, a lower body, and a plurality of valves, and an intermediate plate is interposed between the upper body and the lower body. A plurality of linear solenoid valves are attached to one side surface and a plurality of directional control valves are attached to other side surface on the upper body. The lower body has a plurality of shift valves for shifting a flow of an output fluid output from the linear solenoid valves. Also, the lower body is provided with a plurality of accumulators and an input-output port portion.

7 Claims, 13 Drawing Sheets

SOLENOID VALVE DEVICE

CROSS REFERENCE TO RELATED APPLICATIONS

The present application claims benefit of the filing date of Japanese Patent Applications No. 2009-266472 filed on Nov. 24, 2009, and No. 2009-266473 filed on Nov. 24, 2009, the disclosure of which are incorporated herein by reference.

BACKGROUND OF THE INVENTION

1. Field of the Invention

The present invention relates to a solenoid valve device.

2. Description of the Related Art

Conventionally, it is well known that a linear solenoid valve controls an oil pressure of an oil hydraulic circuit connected to an automatic transmission of a vehicle such as an automobile, etc.

Generally, the linear solenoid valve comprises: a solenoid portion which is provided with a valve body at one end; a spool which is pushed in one direction by an electromagnetic thrust generated at the solenoid portion and is inserted into a valve hole provided in the valve body; a regulating cock which is fixed to a mounting hole formed at the other end of the valve body; a return spring which is placed and compressed between the regulating cock and the spool so as to bias the spool in the direction opposite to the electromagnetic thrust (for example, see JP 2001-124231 A).

A set load of a valve spring is regulated depending on a pushed depth of the regulating cock into the valve body, and an output oil pressure output from the spool is regulated by regulating the set load of the return spring. Such regulation of the set load is performed at the time of assembling the linear solenoid valve.

Conventionally, in an oil pressure control (a transmission control) of the automatic transmission, a plurality of the aforementioned linear solenoid valves are generally used. At the time of the transmission control, excitation, non-excitation, and current control of each of the linear solenoid valves are performed so that the shifted-transmission determined to be done comes into effect.

SUMMARY OF THE INVENTION

By the way, a switching valve for switching liquid paths and other components lie between each of the linear solenoid valves and the automatic transmission which is an external unit to the linear solenoid valve. For this reason, the aforementioned regulation of the set load at the time of assembling of the linear solenoid valve is performed after predicting a final output pressure of an output fluid supplied to the automatic transmission via the switching valve and the components. Therefore, management of the final output pressure is difficult.

Also, in addition, each of the linear solenoid valves, the switching valve, and the other components are generally placed individually using vacant space around the automatic transmission in an engine compartment of the automobile, and various liquid path resistances lie between each of the linear solenoid valves and the automatic transmission. For this reason, it is complicated to regulate and manage the final output pressure of the output fluid.

Therefore, it is an object of the present invention to provide a solenoid valve device in which regulation and management of the final output pressure of the output fluid supplied to the external unit are easy, and the output pressure can be regulated with high precision.

In order to achieve the above object, the present invention provides a solenoid valve device, comprising: an integrated body, the integrated body comprises an upper body and a lower body; a plurality of valves; and an intermediate plate interposed between the upper body and the lower body, wherein a plurality of linear solenoid valves are attached as the valves to a side surface of the upper body, a plurality of directional control valves are attached to another side surface opposite to the side surface, and wherein the lower body is provided with a plurality of shift valves as the valves for shifting a flow of an output fluid output from the plurality of linear solenoid valves, and the lower body is further provided with a plurality of accumulators and a input-output port portion through which a plurality of input and output ports are provided.

According to this solenoid valve device, because the solenoid valve device is composed of the upper body on which the plurality of linear solenoid valves are attached to one side surface and the plurality of directional control valves are attached to other side surface as various kinds of valve; the plurality of shift valves; and the lower body which is provided with the plurality of accumulators and the input-output port portion in which each of the components is unitized, circulation of the pressure fluid is enhanced, operational responsibility of each valve is enhanced, and assembling of parts is enhanced.

Also, according to this solenoid valve device, the plurality of linear solenoid valves, the plurality of directional control valves, the plurality of shift valves, the plurality of accumulators, and the input-output port portion can be intensively mounted on the upper body and the lower body, the output pressure of the output fluid output from this solenoid valve device can be output as the final output pressure supplied to, for example, the automatic transmission mounted on the automobile as the external unit.

Therefore, in the solenoid valve device, regulation and management of the final output pressure of the output fluid supplied to the external unit can be performed, and an advantage that regulation and management of the final output pressure can be performed easily is obtained.

In addition, because the output fluid output from the solenoid valve device can be directly supplied to the external unit, the output pressure can be regulated with high precision, and the external unit can be controlled with high precision.

Also, according to the present invention, each of the plurality of linear solenoid valves is provides with a pressure regulating portion for regulating the output pressure of the output fluid, and the pressure regulating portion regulates the final output pressure of the output fluid supplied to the external unit through the output port.

According to this solenoid valve device, the final output pressures of the output fluids supplied to the external unit through the output ports can be regulated respectively by regulating pressure regulating portions provided in the plurality of linear solenoid valves, and an advantage that regulation and management of the final output pressure can be performed easily is obtained.

In addition, the output pressures of the output fluids supplied to the external unit can be regulated with high precision by regulating the pressure regulating portions respectively, thereby controlling the external unit with high precision using the solenoid valve device.

Also, according to the present invention, the accumulator is provided in a projecting portion projected from the lower body, and ribs are formed on an external wall of the projecting portion in the direction of the projecting portion.

According to this solenoid valve device, the stiffness of the projecting portion having the accumulator can be ensured, and the accumulators having capacities can be preferably provided.

Also, because the accumulator is provided in the projecting portion projected from the lower body, for example, in the case where a solenoid valve device is attached to an automatic transmission, etc., in an engine compartment of an automobile through a lower body, the solenoid valve device can be attached so that the projecting portion is fitted within the automatic transmission, etc. Therefore, the solenoid valve device can be placed with less projecting portions on the automatic transmission, etc. As a result, space can be saved, and flexibility in layout can be increased.

Also, according to the present invention, the linear solenoid valve comprises: a linear solenoid portion which is made to slide along an axial portion by exciting a coil; a valve body in which a spool is embedded, the spool can slide while the axial portion slides; a chamber which is provided in the valve body, is adjacent to the linear solenoid portion, encloses the axial portion, and into which a fluid flows to be stored; and a port which is provided through the chamber so as to discharge the fluid stored in the chamber, wherein a part of the axial portion is immersed in the fluid stored in the chamber, and an opening of the port communicates with an inside of the chamber at a place which is vertically above a liquid level of the fluid.

According to this solenoid valve device, because a part of the axial portion is immersed in the fluid stored in the chamber and the opening of the port communicates with the inside of the chamber at the place which is vertically above the liquid level of the fluid, the part of the axial portion is almost always immersed in the fluid stored in the chamber and the fluid can be supplied to the linear solenoid portion through the axial portion. For this reason, the linear solenoid portion can preferably slide using the fluid, and slidability in the linear solenoid portion can be enhanced.

Also, according to the present invention, the axial portion is slidably supported by a bearing in the linear solenoid portion. By such structure, the slidability of the axial portion can be enhanced.

Also, because the bearing can preferably slide using the fluid supplied to the linear solenoid portion through the axial portion, the slidability in the linear solenoid portion can be further enhanced.

Also, according to the present invention, grooves are formed on a circumferential surface of the bearing in an axial direction of the axial portion. By such structure, the fluid preferably flows through the grooves on the circumferential surface of the bearing in the axial direction of the axial portion, and the slidability in the linear solenoid portion can be further enhanced.

According to the present invention, it is possible to obtain a solenoid valve device in which regulation and management of the final output pressure of the output fluid supplied to the external unit are easy, and the output pressure can be regulated with high precision.

DETAILED DESCRIPTION OF THE PREFERRED EMBODIMENT

Hereinafter, with reference to FIGS. 1-13, an embodiment of the present invention will be explained in detail.

Although a solenoid valve device for controlling an automatic transmission mounted on a vehicle such as an automobile, etc., will be explained as an external unit in this embodiment, that does not limit the external unit and a system, etc. controlled by the solenoid valve device.

(Summary of the Solenoid Valve Device)

Figure 1:
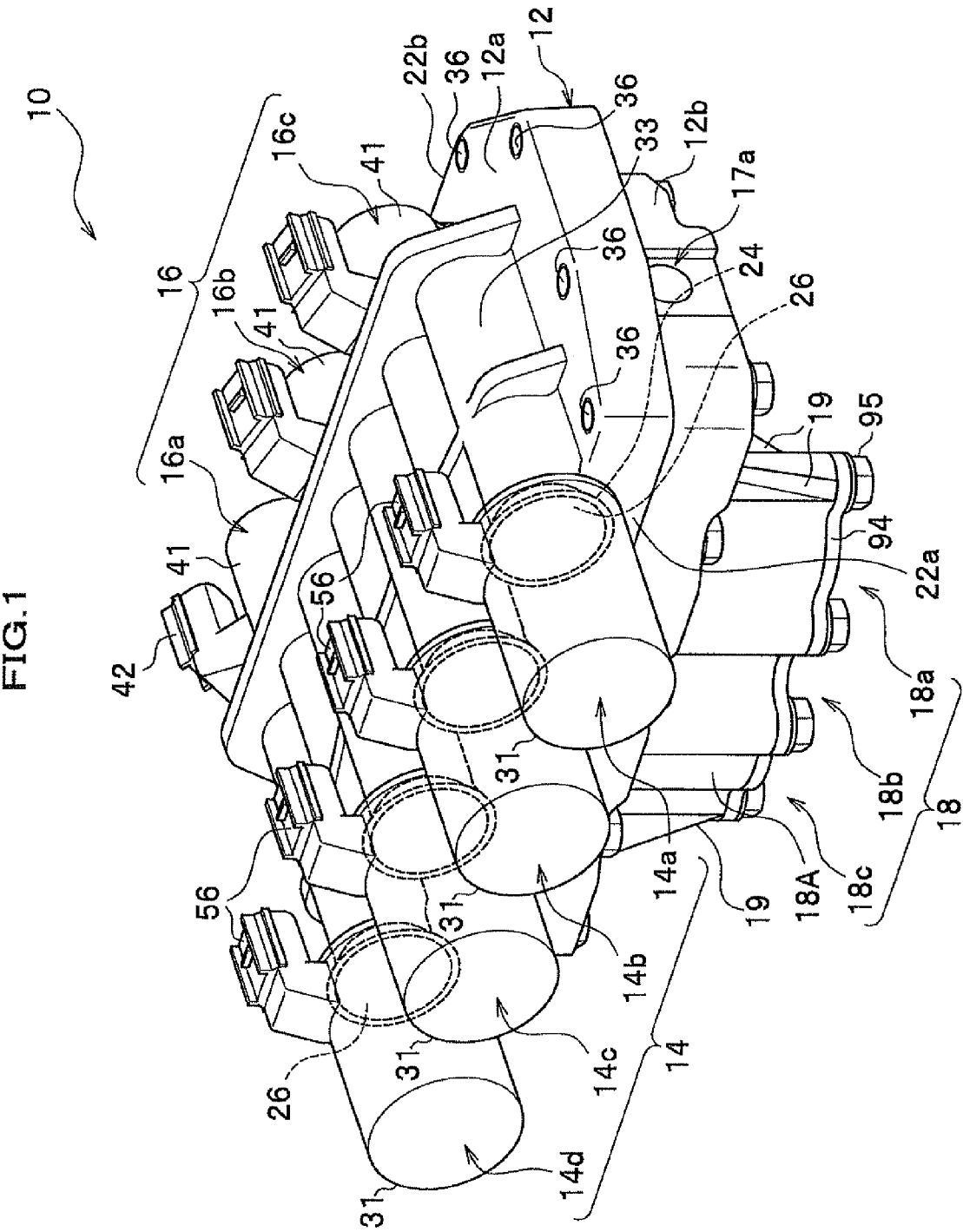
FIG. 1 is a perspective view of a solenoid valve device of one embodiment according to the present invention viewed from an upper body side.

A solenoid valve device 10 is, for example, a device for controlling an automatic transmission 100 (see FIG. 11, the same shall apply hereinafter) mounted on a vehicle such as an automobile, etc. As shown in FIG. 1, the solenoid valve device 10 basically comprises an approximately rectangular parallelepiped body 12 in which oil paths (liquid paths) through which a pressure oil (an oil) flows as an output fluid are formed; valve mechanics such as a plurality of linear solenoid valves 14 (14a-14d), a plurality of three-way valves (directional control valves) 16 (16a-16c), and a plurality of shift valves 17a and 17b, etc.; a plurality of accumulators 18 (18a-18c); and an input-output port portion 20 (see FIG. 2), etc.

That is, in the solenoid valve device 10 of this embodiment, a plurality of components, which are normally provided between the plurality of linear solenoid valves 14a-14d and the automatic transmission 100, are integrally attached to the body 12 to be fabricated as an assembly. Therefore, there is no need to provide components between the solenoid valve device 10 and the automatic transmission 100. As a result, an output pressure of the pressure oil output from the input-output port portion 20 (see FIG. 2) of the solenoid valve device 10 can be made to a final output pressure of the pressure oil supplied to the automatic transmission 100.

The body 12 comprises an upper body 12a and a lower body 12b which are stacked vertically. On the upper body 12a, the plurality of linear solenoid valves 14a-14d are attached to one side surface 22a which is orthogonal to an axis (in the longitudinal direction) of the body 12, and the plurality of three-way valves 16a-16c are attached to other side surface 22b opposite to the side surface 22a.

Also, the plurality of shift valves 17a and 17b (see FIG. 10) are provided in the lower body 12b, and the accumulators 18a-18c and the input-output port portion 20 (see FIG. 2) are provided at a bottom surface of the lower body 12b.

Figure 2:
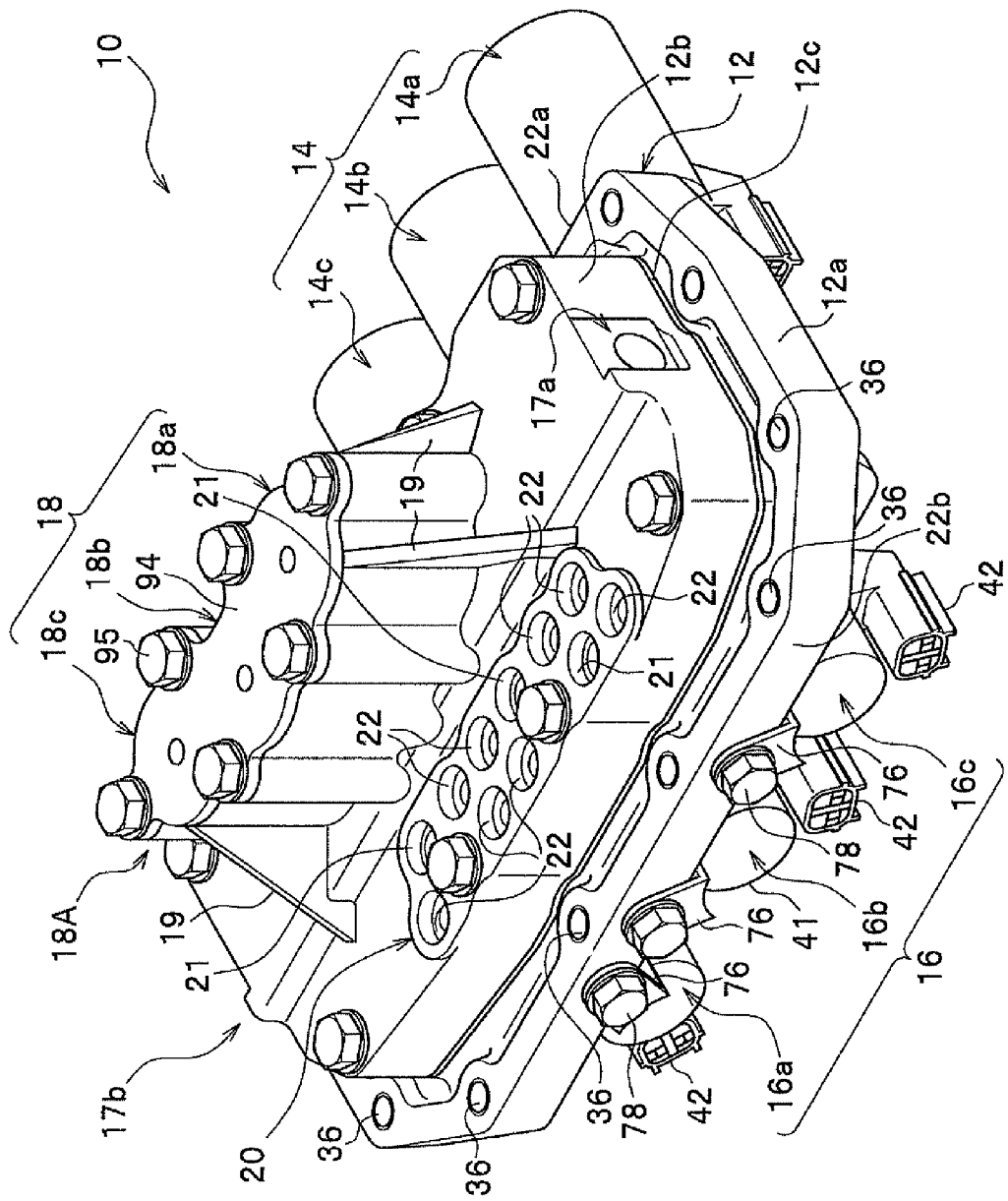
FIG. 2 is a perspective view of the solenoid valve device viewed from a lower body side.

As shown in FIG. 2, a tabular intermediate plate 12c is interposed between the upper body 12a and the lower body 12b so as to partially communicate oil paths R1 (see FIG. 6, the same shall apply hereinafter) formed on the upper body 12a with oil paths R2 (see FIG. 7, the same shall apply hereinafter) formed on the lower body 12b.

Figure 11:
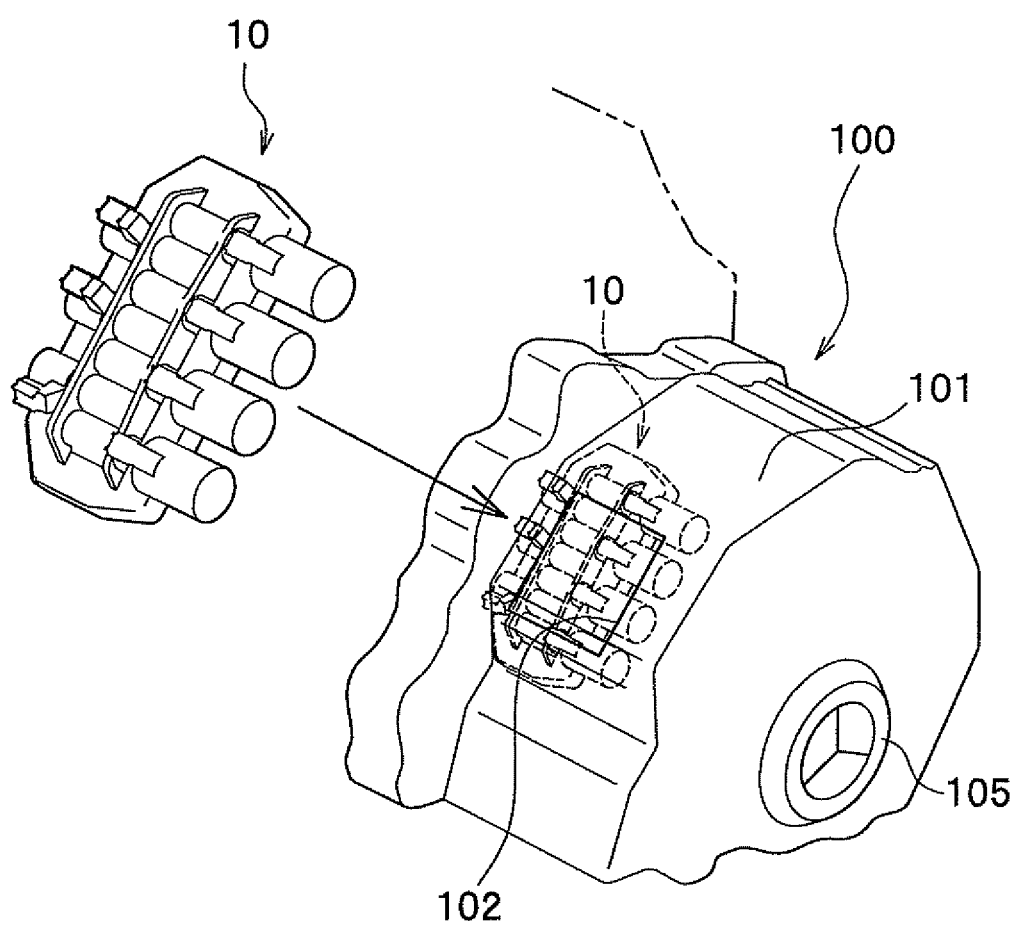
FIG. 11 is a perspective view of the solenoid valve device attached to the external unit.

As shown in FIG. 11, such solenoid valve device 10 is attached to, for example, a side wall 101 of the automatic transmission 100 placed in an engine compartment with a bolt (not shown), and regulates a pressure of the pressure oil supplied from an oil pressure pump 105 (an oil pressure source) so as to output a final output pressure supplied to a clutch (not shown) provided on the automatic transmission 100. In this embodiment, a mounting hole 102 is formed through the side wall 101 of the automatic transmission 100, and the lower body 12b (see FIG. 1, etc.) of the solenoid valve device 10 is inserted into the automatic transmission 100 through this mounting hole 102 to be fixed to the side wall 101. More details will be provided later.

Hereinafter, each part of the solenoid valve device 10 will be explained.

<Upper Body>

Figure 3:
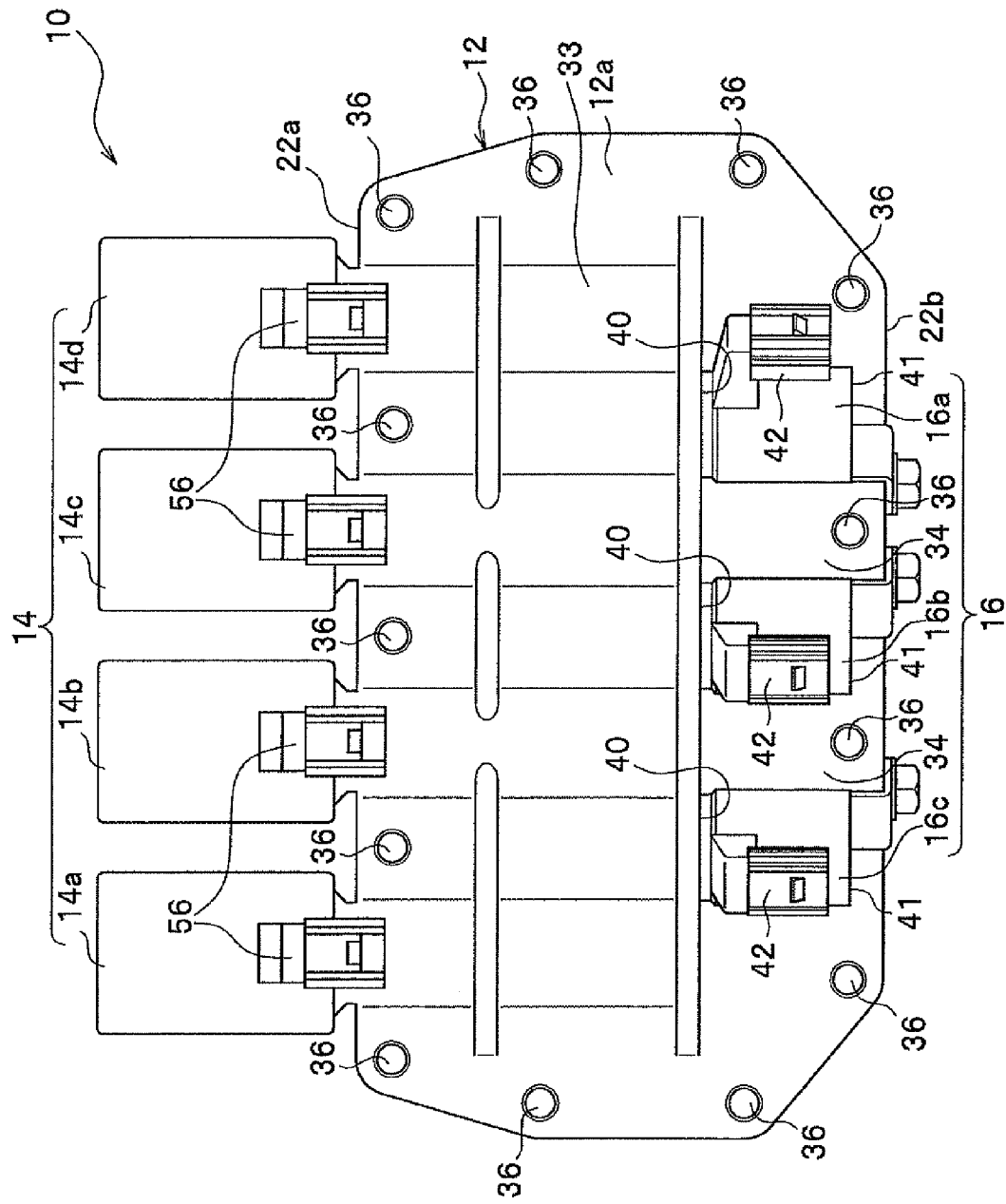
FIG. 3 is a plan view of the solenoid valve device.

As shown in FIGS. 1 and 3, on a top surface of the upper body 12a, the linear solenoid valves 14a-14d and the three-way valves 16a-16c are alternately placed along a longitudinal direction of the upper body 12a (an axial direction of the body 12) in parallel. The linear solenoid valves 14a-14d are placed so that housings 31 project toward a side of the side surface 22a in a lateral direction of the upper body 12a (in a direction orthogonal to the axial direction of the body 12), and the three-way valves 16a-16c are placed so that housings 41 project toward a side of the side surface 22b.

A plurality of flange portions 24 whose openings are circular project toward the side of the side surface 22a, and a spool mounting hole 26 is provided in the flange portion 24. This spool mounting hole 26 is formed toward the side surface 22b in a central protrusion 33 of the upper body 12a (see FIG. 10), and is blocked by pressing a blocking member 64 (see FIGS. 8A and 10) into a terminal hole on the side of the side surface 22b. Here, the central protrusion 33 serves as a valve body 44 (see FIG. 8A) of the linear solenoid valves 14a-14d.

In addition, although four linear solenoid valves 14a-14d are shown in this embodiment, the present invention limited to this. Any numbers of the linear solenoid valves can be placed, and a plurality of the linear solenoid valves are preferably placed.

At the side of the side surface 22a, the housing 31 which includes a linear solenoid portion 30 described below (see FIG. 8A) is attached to a lateral face of the flange portion 24.

As shown in FIG. 3, three-way valve mounting holes 40 are provided on the side of the side surface 22b. These three-way valve mounting holes 40 are formed as blocking holes to be terminated within the central protrusion 33 of the upper body 12a. Here, valve bodies including valve elements (not shown) of the three-way valves 16a-16c are inserted into the three-way valve mounting holes 40 respectively, and the housings 41 which enclose solenoid portions (not shown) are attached to a lateral face on the side of the side surface 22b so as to be projected.

Figure 4:
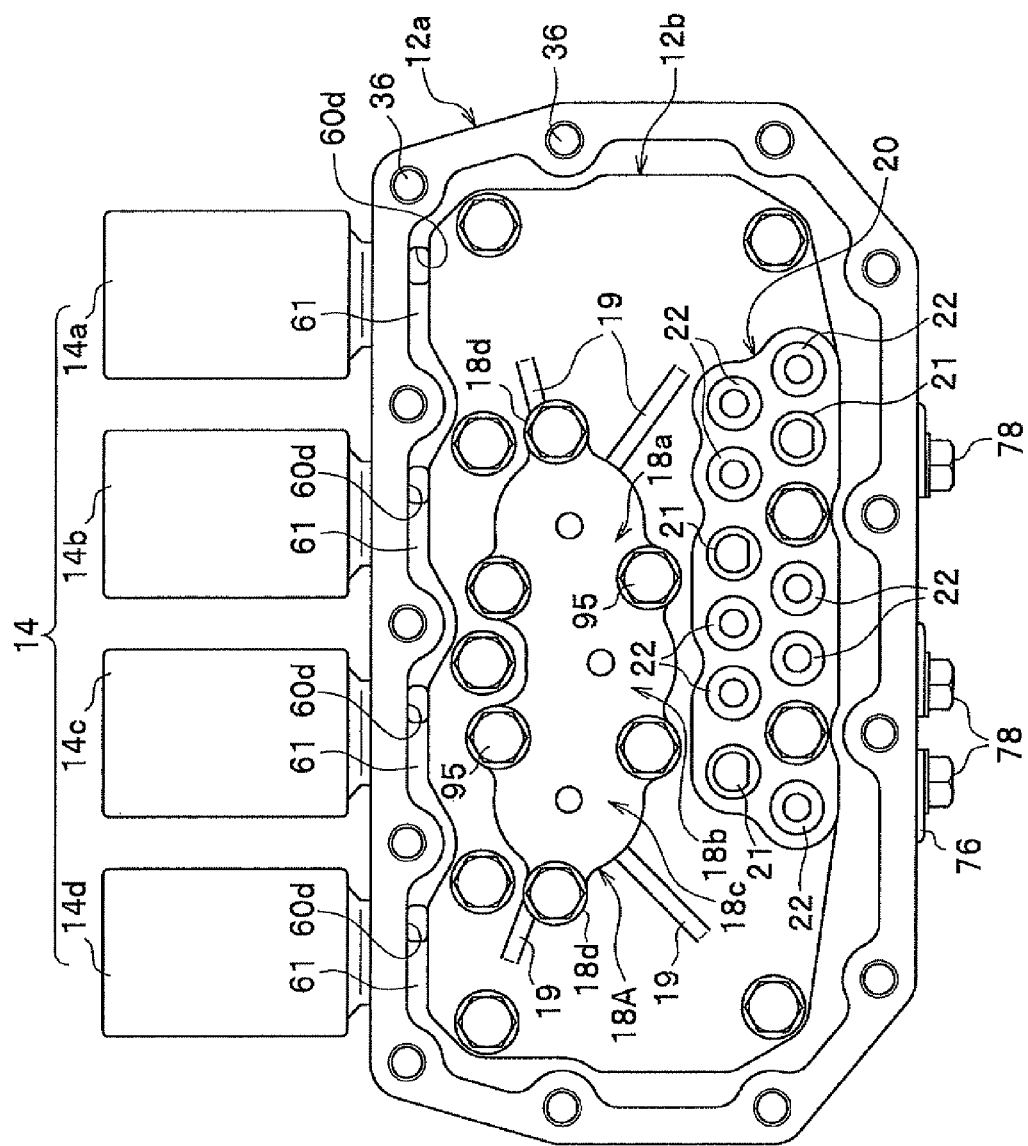
FIG. 4 is a bottom view of the solenoid valve device.
Figure 5:
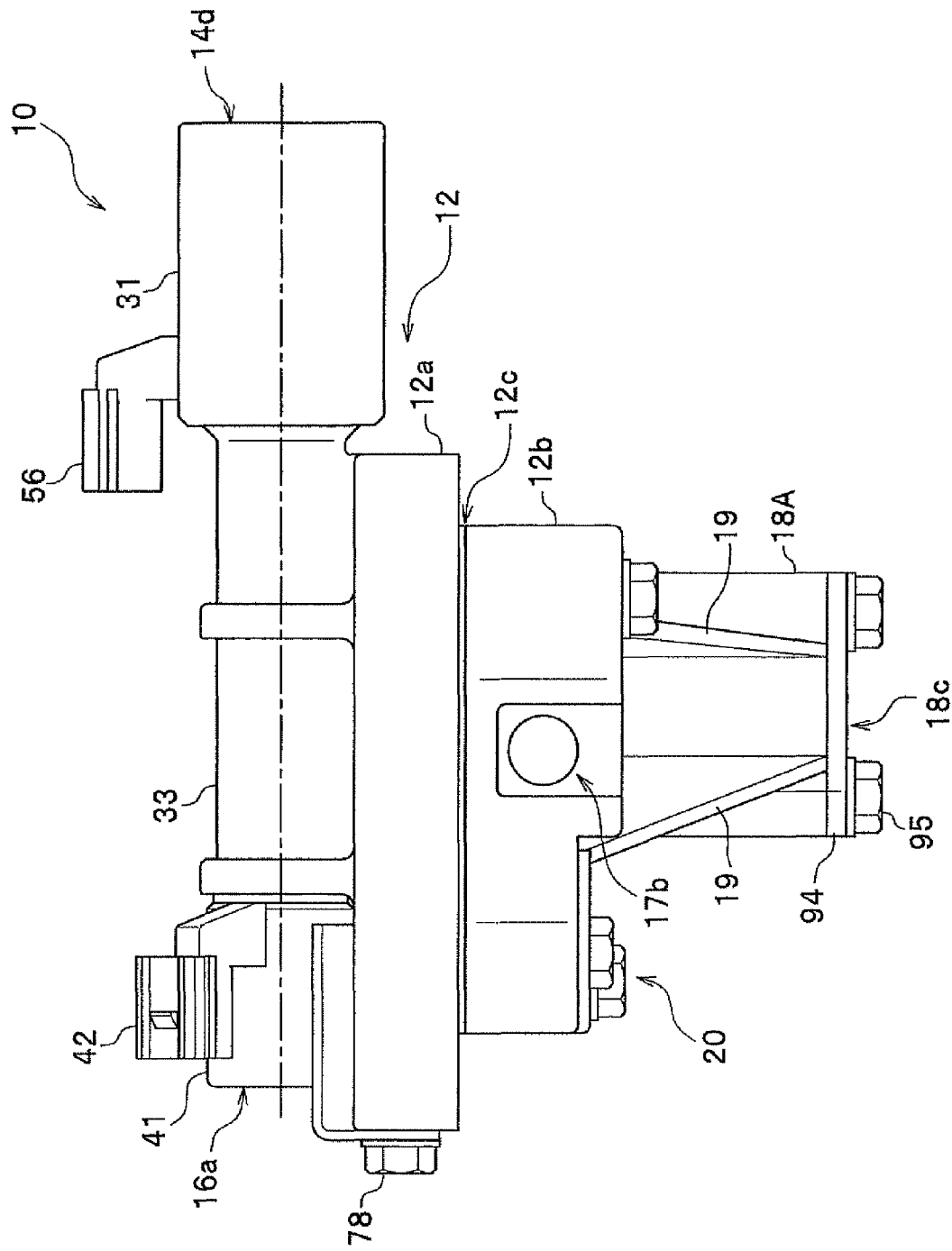
FIG. 5 is a side view of the solenoid valve device.

Also, as shown in FIGS. 3 and 4, a plurality of bolt insertion holes 36 are formed on a peripheral portion of the upper body 12a at regular intervals so as to attach the solenoid valve device 10 to the side wall 101 (see FIG. 11) of the automatic transmission 100.

Figure 6:
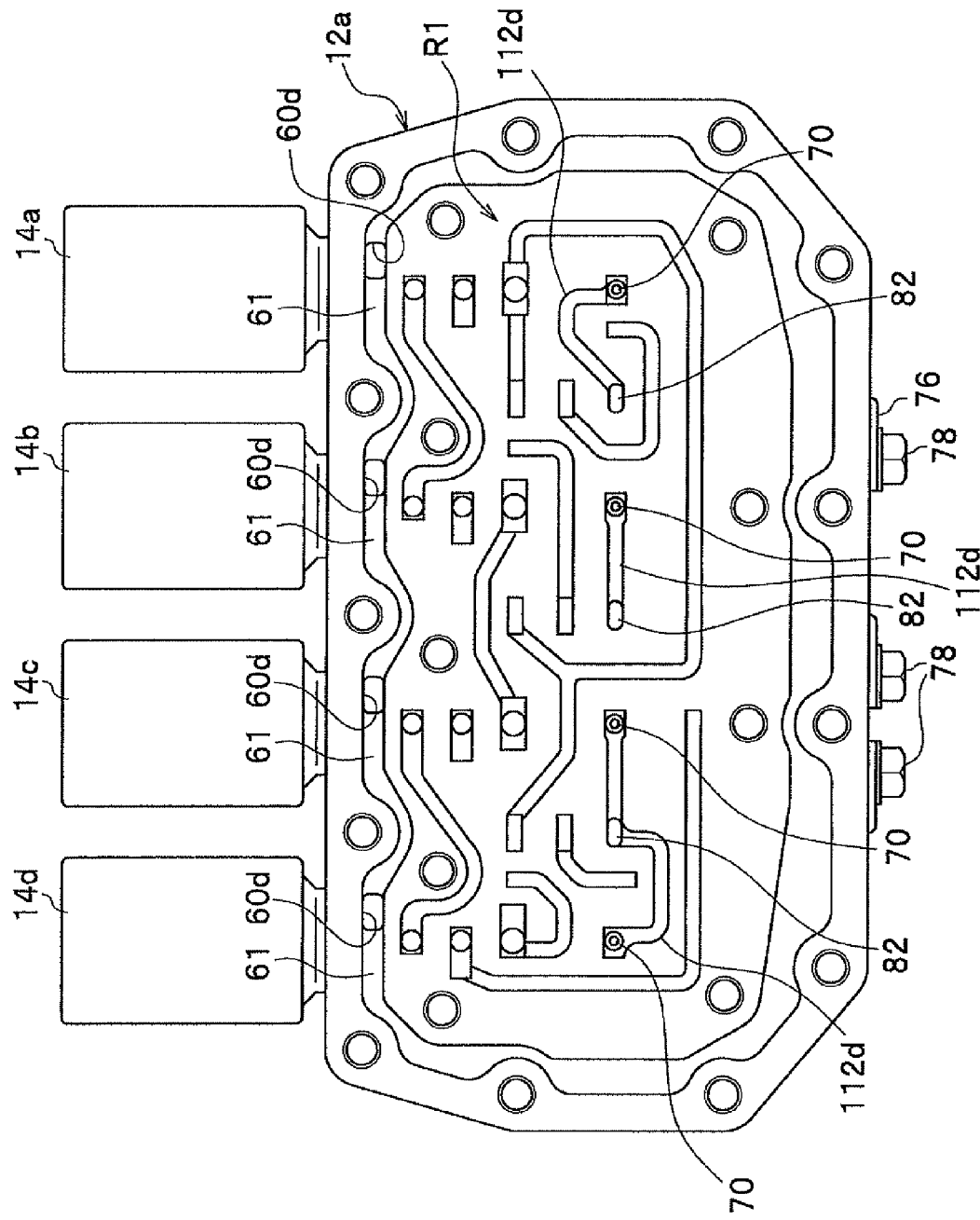
FIG. 6 is a bottom view of the upper body.
Figure 7:
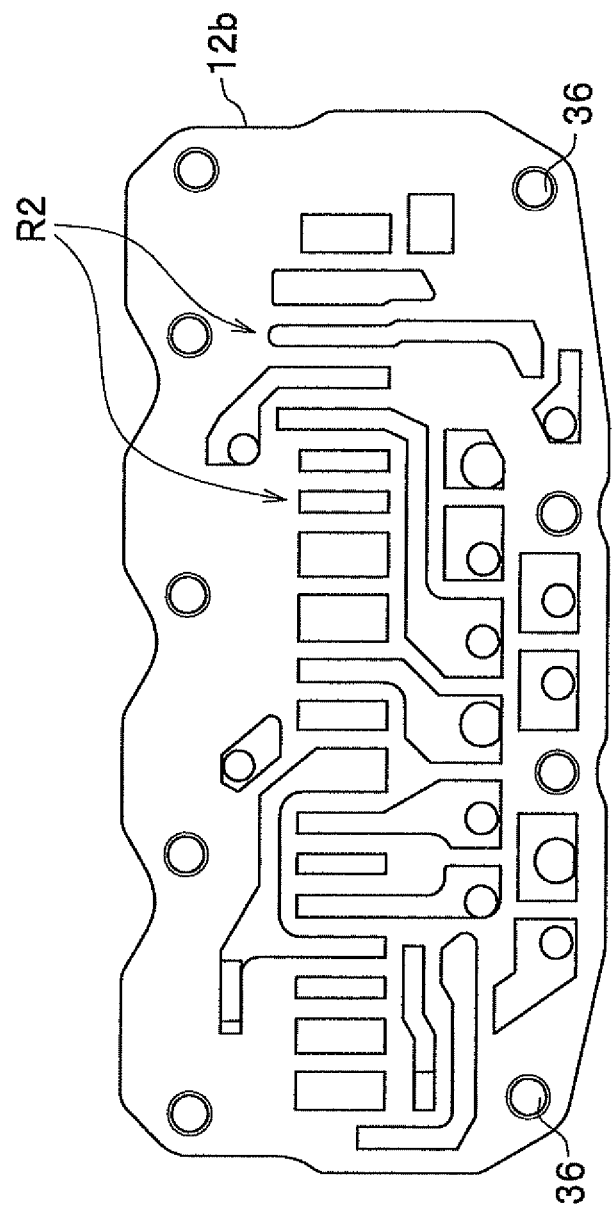
FIG. 7 is a plan view of the lower body.

As shown in FIG. 6, a plurality of oil paths R1 are formed on the bottom surface of the upper body 12a so as to be exposed. The linear solenoid valves 14a-14d is connected to the three-way valves 16a-16c through the plurality of oil paths R1. At the time of transmission control of the automatic transmission 100, excitation, non-excitation, and current control of each of the linear solenoid valves 14a-14d are performed and the pressure oil flows through each of the oil paths R1.

In addition, part of the oil paths R1 communicates with the oil path R2 (see FIG. 7) provided on the lower body 12b through communicating holes (not shown) provided through the intermediate plate 12c (see FIG. 2).

Also, an annular drain groove 61 is formed along the outer edge on the bottom surface of the upper body 12a with the groove is toward the bottom surface. In the drain groove 61, breathing ports (ports) 60d are provided so as to communicate with breathing chambers 60e (see FIGS. 8A and 8B) of the linear solenoid valves 14a-14d.

(Linear Solenoid Valve)

Because the plurality of linear solenoid valves 14a-14d have the same structure, the linear solenoid valve 14a will be explained as an example.

Figure 8A:
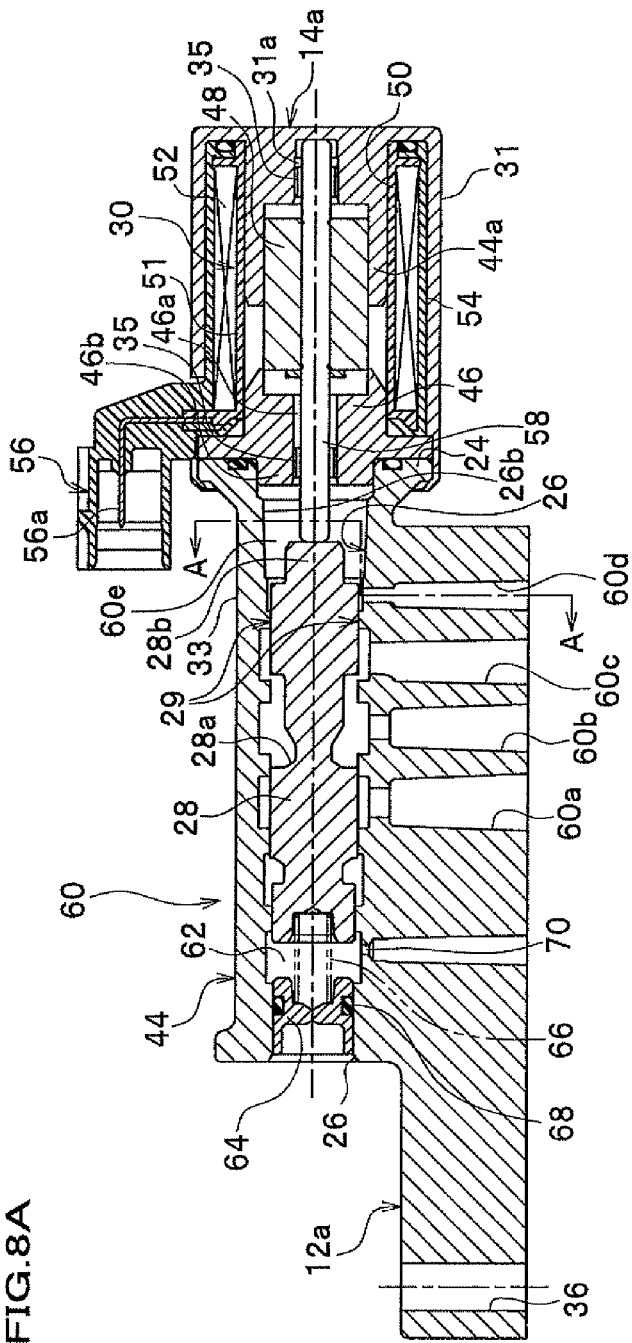
FIG. 8A is a longitudinal sectional view of a linear solenoid valve.

As shown in FIG. 8A, the cylindrical linear solenoid valve 14a is made of, for example, a magnetic metal material, has a bottom, the housing 31 which encloses the linear solenoid portion 30, and the valve body 44 which is integrally formed on the upper body 12a and encloses a valve operating portion 60.

The linear solenoid portion 30 has a coil assembly 50 which is enclosed in the housing 31, a cylindrical yoke 44a which is integrally formed with the housing 31 and is placed within the coil assembly 50, a fixed core 46 which is placed along the axial direction within the coil assembly 50 with keeping a predetermined clearance to the cylindrical yoke 44a, and a movable core 48 which is movably placed within the cylindrical yoke 44a.

The coil assembly 50 is composed of a coil bobbin 51 which is made of a resinous material and has flanges at both ends along the axis, and a coil 52 wound around the coil bobbin 51.

In addition, the coil assembly 50 may be composed without the coil bobbin 51 (bobbin-less structure).

A resin sealing member 54 which is made by molding the circumferential surface, etc., of the coil 52 is provided between the housing 31 and the coil 52. The resin sealing member 54 includes a coupler 56 connected to the coil 52, and is integrally molded by the resinous material. The coupler 56 is provided with a terminal 56a which is electrically connected to the coil 52. The movable core 48 is composed of a cylindrical body with a shaft (axial portion) 58 passing through its center portion.

The shaft 58 is fixed to the movable core 48, slidably passes through a bearing 35 fixed to a through hole 46a of the fixed core 46, and its tip reaches to the breathing chamber 60e formed in the spool mounting hole 26 at the end of the valve body 44. Also, a back end of the shaft 58 slidably passes through the bearing 35 fixed to a blind hole 31a of the housing 31. Also, a tip of the shaft 58 touches an end of a spool 28 in the breathing chamber 60e.

Figure 8C:
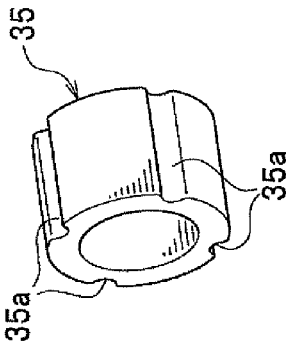
FIG. 8C is an enlarged perspective view of a bearing.

Here, as shown in FIG. 8C, grooves 35a are formed of a circumferential surface of the bearing 35 along the axial direction of the shaft 58. This groove 35a forms a gap to the inside of the through hole 46a of the fixed core 46, and contributes to circulation of an oil W flowing through the through hole 46a using the shaft 58. In addition, in FIG. 8B, the bearing 35 is shown by a chain double-dashed line, and an inner dashed-line corresponds to a bottom of the groove 35a.

In addition, the movable core 48 may be integrally formed with the shaft 58 (shaft-less structure).

In such linear solenoid portion 30, by turning on a power source (not shown) so as to supply current to the coil 52, an excitation effect is caused and the movable core 48 is displaced integrally toward the fixed core 46 by the excitation effect. For this reason, the spool 28 enclosed in the valve body 44 is pushed by the shaft 58 and is caused to be operated (forward-backward movement). As a result, an electromagnetic thrust in proportion to the current flowing through the coil 52 is transmitted to the spool 28 by the movable core 48 and the spool 28 can be operated.

The valve operating portion 60 is provided with an inlet port 60a; an out let port 60b; the valve body 44 (the upper body 12a) which is provided with a drain port 60c and the breathing port 60d; and the spool 28 which is placed along an inner space of the valve body 44 in the axial direction. As described above, the spool 28 touches the tip of the shaft 58 which is fixed to the movable core 48 of the linear solenoid portion 30, is pushed by the slide of the movable core 48 via the shaft 58, and slides within the valve body 44.

At the end of the valve operating portion 60 (at the end of the valve body 44), the breathing chamber 60e is formed adjacent to the linear solenoid portion 30. The breathing chamber 60e is surrounded by an inner wall 26b of the spool mounting hole 26, an end 28b of the spool 28, and an end 46b of the fixed core 46 of the linear solenoid portion 30 which is opposite to the end 28b at a predetermined interval, and the tip of the shaft 58 extended from the linear solenoid portion 30 is in the breathing chamber 60e.

At a lateral face of the breathing chamber 60e, a gap 29 is formed between the spool mounting hole 26 and the spool 28 in the circumferential direction. This gap 29 communicates with the drain port 60c at its one end, and the oil W flows from the drain port 60c into the breathing chamber 60e through the gap 29 so as to be stored by a predetermined volume.

Figure 8B:
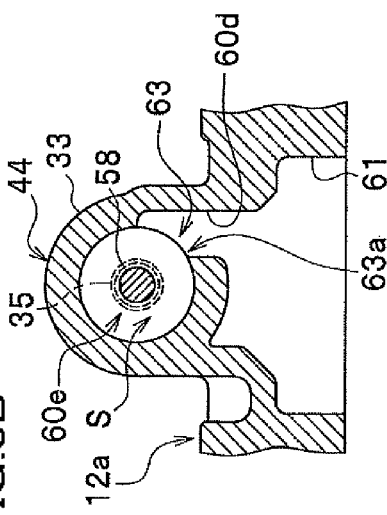
FIG. 8B is a cross-sectional view taken along the line A-A in FIG. 8A.

On the other hand, as shown in FIG. 8B, the breathing port 60d communicates with the breathing chamber 60e. This breathing port 60d serves as an atmospheric pressure introducing path. Also, the breathing port 60d discharges the stored oil W from the breathing chamber 60e when the stored volume exceeds the predetermined volume.

Figure 9A:
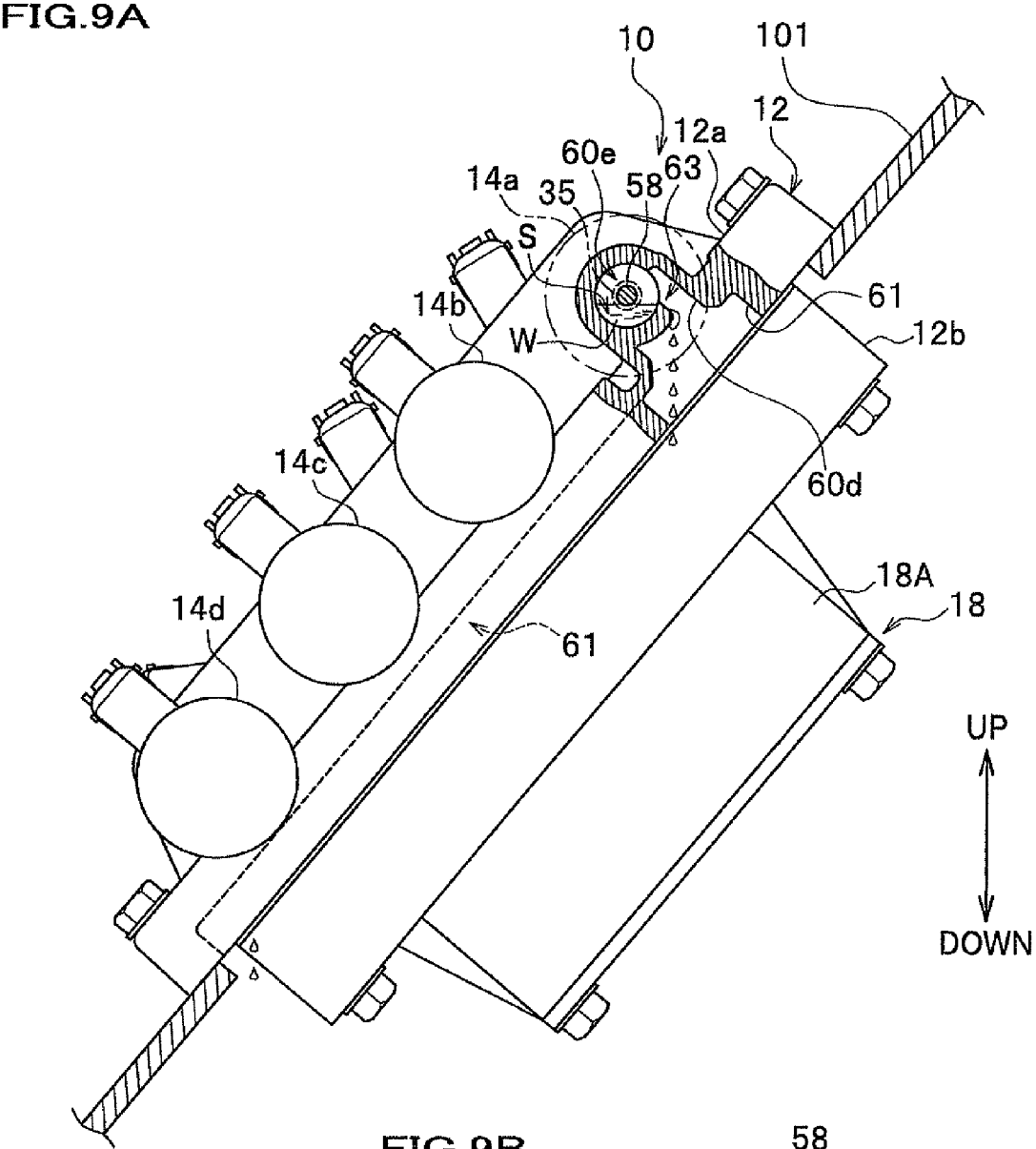
FIG. 9A is a longitudinal sectional view showing a breathing chamber in the case where the solenoid valve device is attached to an external unit.

As shown in FIG. 8B, the breathing port 60d is formed at a place which is displaced from a position which is vertically below the end of the shaft 58 by a predetermined distance in the axial direction of the upper body 12a. Therefore, as shown in FIG. 9A, at a region S which is vertically below the shaft 58, a region S to store the oil W is formed with the solenoid valve device 10 fixed to the side wall 101 of the automatic transmission 100.

Figure 9B:
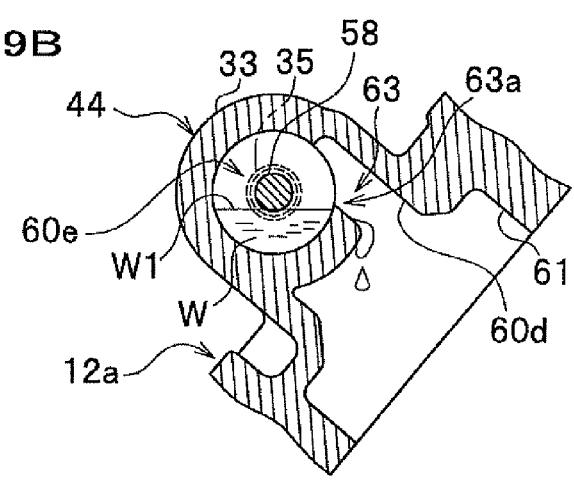
FIG. 9B is a cross-sectional view showing fluid stored in the breathing chamber.

More specifically, as shown in FIG. 9B, in the inside of the breathing chamber 60e, an opening of the breathing port 60d communicates with a place which is vertically above a liquid level W1 of the oil W where a part of the shaft 58 (here, a part of the circumferential surface of the shaft 58) is immersed in the oil W stored in the breathing chamber 60e.

FIG. 9B shows a state where a lower edge 63a of the opening 63 of the breathing port 60d is slightly above the liquid level W1. In this state, a part of the shaft 58 is immersed in the liquid level W1. In addition, in FIG. 9B, the bearing 35 is shown by a chain double-dashed line (an inner dashed-line corresponds to a bottom of the groove 35a).

For this reason, the oil W flows in and out of the breathing chamber 60e and the housing 31 through the shaft 58 is response to the forward-backward movement of the movable core 48, and lubrication on the side of the linear solenoid portion 30 can preferably performed. That is, the bearing 35 which slidably supports the shaft 58 can preferably lubricate by the oil W which flows in and out of through the shaft 58.

In addition, when the oil W flows in the breathing chamber 60e through the gap 29 from the state where a part of the shaft 58 is immersed in the liquid level W1, the oil W is discharged from the breathing port 60d through the opening 63 because the liquid level W1 exceeds the lower edge 63a of the opening 63 of the breathing port 60d.

Also, as shown in FIG. 4, other opening of the breathing port 60d communicates with the annular drain groove 61 which is formed along the outer edge of the bottom surface of the upper body 12a. As shown in FIG. 9A, the oil W which is discharged through the breathing port 60d drops to the automatic transmission 100 along the drain groove 61 to be discharged into the automatic transmission 100.

A line pressure supplied from the oil pressure pump 105 (see FIG. 11) via the input-output port portion 20 (see FIG. 2, the same shall apply hereinafter) of the lower body 12b (see FIG. 2, the same shall apply hereinafter) is input into the inlet port 60a from the oil path R1 of the upper body 12a through the oil path R2 of the lower body 12b and a communicating hole (not shown) of the intermediate plate 12c.

Also, an output hydraulic pressure which is output from the out let port 60b flows to the shift valve 17a through the oil path R1 and flows to the oil path R2 of the lower body 12b through an accumulator 18a, etc., (see FIG. 10), and is supplied to the automatic transmission 100 from the input-output port portion 20.

Also, as described above, a part of the output hydraulic pressure which is output from the out let port 60b flows into the breathing chamber 60e from the drain port 60c through the gap 29.

In addition, the oil W which is discharged from the drain port 60c is turned back to an oil sump (not shown), etc., through the oil path R1, etc. In addition, the fluid which flows into the breathing chamber 60e may be a lubricant, and other liquids having viscosity, etc.

Also, the breathing port 60d discharges the oil (a lubricating oil of the housing 31) which flows in and out of the breathing chamber 60e and the housing 31 in response to the forward-backward movement of the movable core 48. The fluid which is discharged through the breathing port 60d is turned back into the automatic transmission 100.

Also, on the circumferential surface of the spool 28, an annular recess 28a which communicates the inlet port 60a with the out let port 60b, or communicates the out let port 60b with the drain port 60c in response to a displacement of the spool 28 is formed.

Further, as shown in FIG. 8A, the valve operating portion 60 has a blocking member 64 which forms a damper oil chamber 62 by blocking the terminal hole of the valve body 44 which one end of the spool 28 faces; and a return spring 66 which is compressed, is placed between the spool 28 and the blocking member 64, and returns the spool 28 to an original position. On the circumferential surface of the blocking member 64, a sealing-ring 68 is provided so as to keep the push-fitted portion liquid tight or airtight via an annular groove.

The blocking member 64 serves as a pressure regulating portion to regulate an output pressure of the pressure oil which is output from the linear solenoid valve 14a. By regulating a pushed length of the blocking member 64, the output pressure of the pressure oil can be regulated.

As described above, the solenoid valve device 10 comprises the plurality of linear solenoid valves 14a-14d, and also comprises valve mechanics such as the plurality of three-way valves 16a-16c and the plurality of shift valves 17a and 17b, etc., in the body 12; and components such as the plurality of accumulators 18a-18c (see FIG. 2) and the input-output port portion 20 (see FIG. 2), etc. The output pressure of the pressure oil which is output from the linear solenoid valve 14a becomes the output pressure of the solenoid valve device 10 extracted from the input-output port portion 20 via these components. Therefore, regulating the pressure of the blocking member 64 does not only mean regulating the output pressure of the pressure oil which is output from the linear solenoid valve 14a, but also means regulating the output pressure of the pressure oil which is output from the solenoid valve device 10 directly, i.e., regulating the final output pressure of the pressure oil which is finally supplied to the automatic transmission 100 directly.

For this reason, the final output pressure of the pressure oil supplied to the automatic transmission 100 can be obtained precisely by regulating the pushed length of the blocking member 64.

Also, an orifice 70 is provided below the damper oil chamber 62. By providing the damper oil chamber 62, a preferable damping function (an oil damping function) can be exhibited.

(Three-Way Valve)

The plurality of three-way valves 16a-16c have well known and the same structure. The three-way valves 16a-16c is fixed by inserting a bolt 78 (see FIG. 2) into an attaching stay 76 which is fixed to the circumferential surface of the housing 41, and by screwing this bolt 78 into a fixing hole (not shown) formed on the side of the side surface 22b of the upper body 12a. A coupler 42 is provided on the circumferential surface of the housing 41.

<Lower Body>

Figure 10:
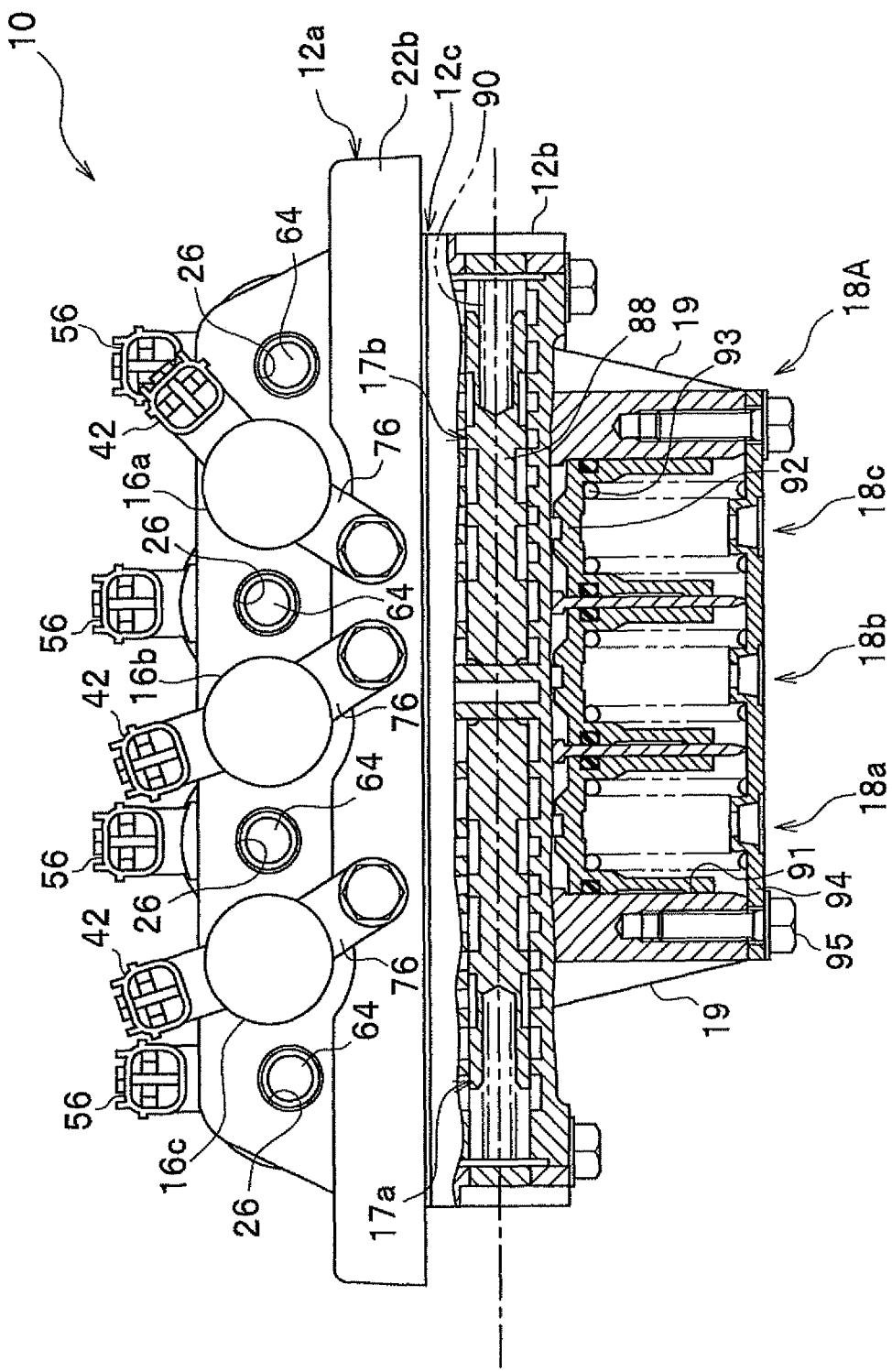
FIG. 10 is a partial sectional view of the lower body.

As shown in FIG. 10, the lower body 12b is fixed to the bottom surface of the upper body 12a via the intermediate plate 12c. As described above, the plurality of shift valves 17a and 17b are provided therein, and the accumulators 18a-18c and the input-output port portion 20 are provided on the bottom surface.

The oil path R2 (see FIG. 7, the same shall apply hereinafter) is provided on the top surface of the lower body 12b upper body 12a so as to be opposite to the oil path R1 (see FIG. 6, the same shall apply hereinafter). A plurality of oil paths R2 are formed, and a part of them communicates with the oil path R1 on the side of the upper body 12a via the intermediate plate 12c.

As shown in FIG. 11, the entire lower body 12b is inserted into the automatic transmission 100 via the mounting hole 102 formed on the side wall 101 when the solenoid valve device 10 is fixed to the side wall 101 of the automatic transmission 100.

As shown in FIG. 10, the shift valves 17a and 17b are provided with a valve element 88 which switches a communicating state and a non-communicating state between each of the oil paths R2, and a spring 90 which pushes the valve element 88 in one direction. A pilot oil pressure signal is input to the shift valve 17a (17b) from the three-way valve 16a (16b). At the time of input, the valve element 88 is displaced in the axial direction against the force of the spring 90, and the shift valve 17a (17b) is switched from a set state (an original state) to an operating state.

The plurality of accumulators 18a-18c are placed in the projecting portion 18A which is provided downwardly from the bottom of the lower body 12b so that its axis is orthogonal to the axis of the body 12, and show damper function to remove a pulsation from the pressure oil which is output from the linear solenoid valve 14a (14b, 14c).

Because the plurality of accumulators 18a-18c have the same structure, the accumulator 18a will be explained as an example.

The accumulator 18a has a blind mounting hole 91 formed on the bottom surface of the projecting portion 18A. A piston 92 and a spring 93 are mounted in this mounting hole 91, and an opening of the mounting hole 91 is closed by a blocking plate 94 which serves as a receiving portion to the spring 93. The blocking plate 94 is fixed by bolts 95.

The piston 92 is forced toward the bottom of the mounting hole 91 by the spring 93, and is moved toward the blocking plate 94 by the oil pressure of the oil which flows from the oil path R2 through a communicating hole (not shown) formed on the bottom (top surface) of the mounting hole 91. As described above, a chamber (not shown) to store the pressure oil is formed between the bottom of the mounting hole 91 and the piston 92 by moving the piston 92 toward the blocking plate 94.

In addition, in the accumulator 18a, because the communicating hole (not shown) is formed on the bottom of the mounting hole 91, the pressure oil flows from the oil path R2 into the chamber directly. For this reason, responsive smoothing of the pressure oil can be performed.

In this embodiment, as shown in FIG. 4, viewing from the bottom surface of the lower body 12b, the accumulator 18b which is placed at the center of the lower body 12b in the axial direction is biased relative to the accumulators 18a and 18c, which are placed both sides of the accumulator 18b, in the lateral direction of the lower body 12b. For this reason, in a structure in which the accumulators 18a-18c are placed in the longitudinal direction of the lower body 12b in parallel, projecting portion 18A can be miniaturized in the longitudinal direction.

As shown in FIGS. 1, 2, 4, 5, and 6, on an external wall (surrounding wall) of the projecting portion 18A, ribs 19 are integrally formed along the projecting direction (up and down direction of the lower body 12b) of the projecting portion 18A. The ribs 19 have an approximately triangular shape where upper side is wider than lower side in lateral view. As shown in FIG. 4, two ribs 19 are provided at both sides of the projecting portion 18A in the longitudinal direction, i.e., four ribs 19 are provided. Two ribs 19 are formed on lateral faces of boss portions 18d provided on the projecting portion 18A.

In addition, although the accumulators 18a-18c are provided so that their axes are orthogonal to the axis of the body 12, the present invention is not limited to this. The axes of the accumulators 18a-18c may be parallel or at an acute angle to the axis of the body 12.

The input-output port portion 20 has a plurality of input ports 21 and a plurality of output ports 22. The input ports 21 and the output ports 22 are formed on the bottom surface of the lower body 12b at side of the projecting portion 18A. Each of the input ports 21 and the output ports 22 communicates with the oil path R2 formed on the lower body 12b.

Such an input-output port portion 20 can be connected to a connecting port (not shown) provided within the mounting hole 102 (see FIG. 11) of the automatic transmission 100. Also, a line pressure from the oil pressure pump 105 (see FIG. 11) of the automatic transmission 100 is applied to the input port 21, and the applied line pressure is regulated to a predetermined pressure and a pressure oil supplied to oil pressure actuating portions of a plurality of clutches (not shown) provided in the automatic transmission 100 is delivered from the output port 22.

The solenoid valve device 10 according to this embodiment is basically constructed as described above. Next, with reference to an oil hydraulic circuit shown in FIGS. 12 and 13, its operation and effect will be explained.

Figure 12:
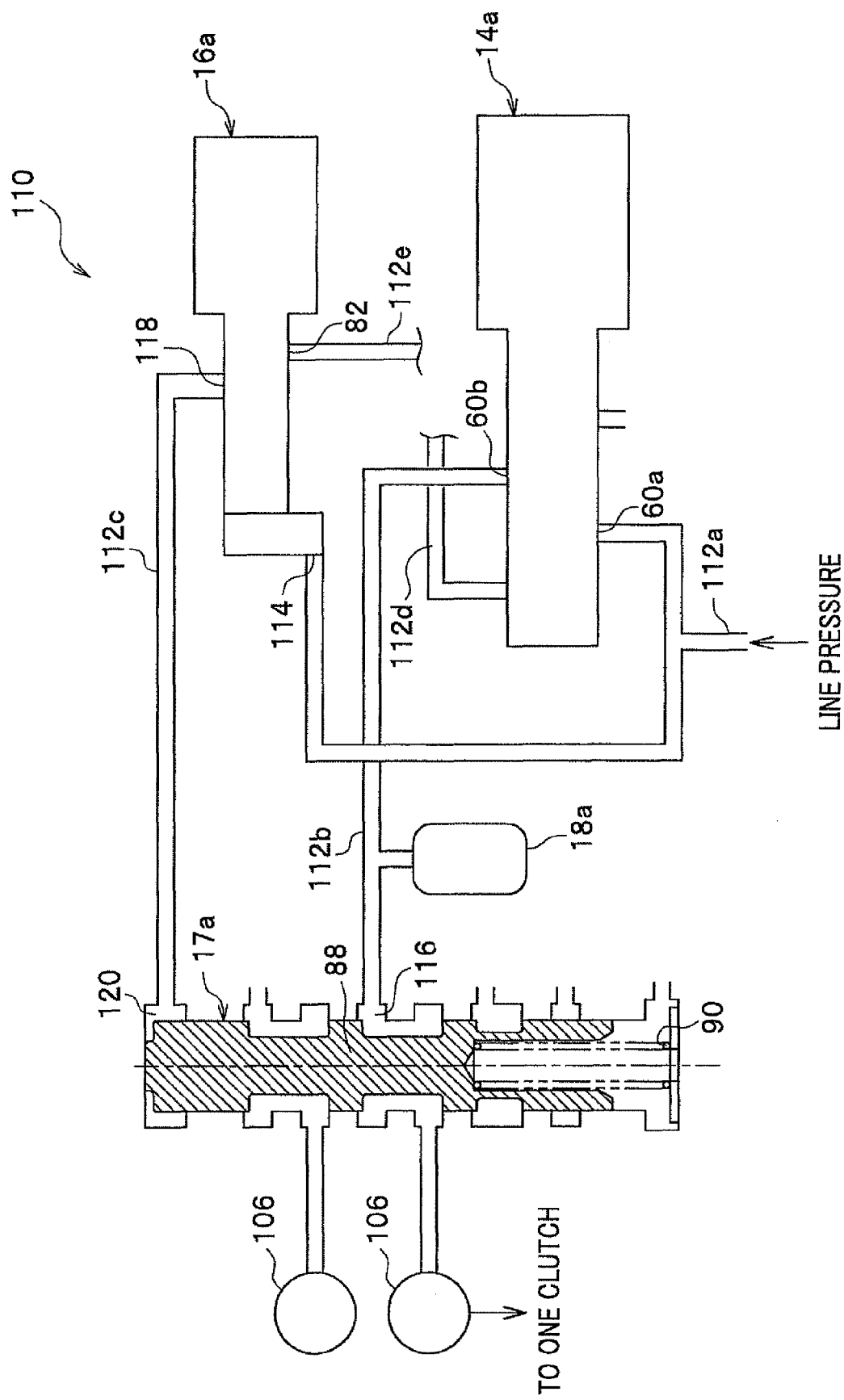
FIG. 12 shows a partial hydraulic circuit of the solenoid valve device in the case where an output hydraulic pressure is applied to one external unit.

In the oil hydraulic circuit shown in FIG. 12, the line pressure is applied to the inlet port 60a of the linear solenoid valve 14a and a first port 114 of the three-way valve 16a respectively via a first oil path 112a which branches off on its way. Also, an out let port 60b of the linear solenoid valve 14a is connected to an entry port 116 of the shift valve 17a via a second oil path 112b, and the accumulator 18a is provided at a middle point of the second oil path 112b.

Further, a second port 118 of the three-way valve 16a is connected to a pilot port 120 of the shift valve 17a via a third oil path 112c. Still further, the orifice 70 which communicates with the damper oil chamber 62 (see FIG. 8A) of the linear solenoid valve 14a is connected to an oil sump portion (not shown) via a fourth oil path 112d. Also, a drain port 82 of the three-way valve 16a is connected to the oil sump portion (not shown) via a fifth oil path 112e.

In addition, the line pressure supplied to the inlet port 60a of the linear solenoid valve 14a is delivered from the second oil path 112b via the out let port 60b depending on a degree of regulation of the pressure of the linear solenoid valve 14a corresponding to a current value supplied to the linear solenoid portion 30.

In such liquid pressure (an oil pressure) circuit, as shown in FIG. 12, in the set state (original state) of the shift valve 17a where the valve element 88 is not displaced, the pressure oil delivered from the out let port 60b of the linear solenoid valve 14a is introduced in the shift valve 17a via the second oil path 112b, is supplied to the oil pressure actuating portion of one clutch (not shown) connected to a predetermined output port 106, and one clutch becomes engaged state.

On the other hand, by supplying the pressure oil to the pilot port 120 of the shift valve 17a from the second port 118 of the three-way valve 16a via the third oil path 112c, the valve element 88 of the shift valve 17a is displaced and the set state (original state) is changed to the operating state.

Figure 13:
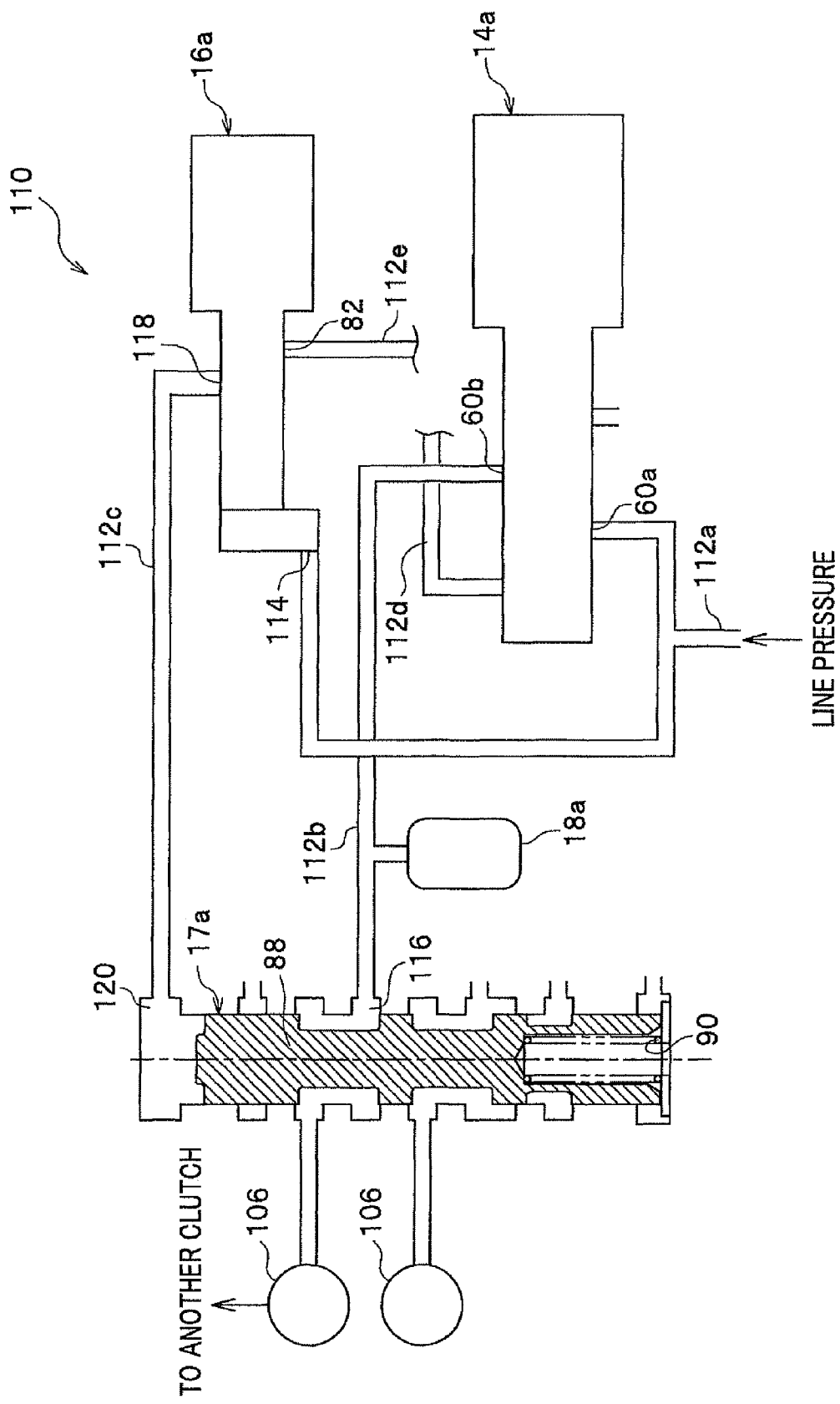
FIG. 13 shows a partial hydraulic circuit of the solenoid valve device in the case where the output hydraulic pressure is applied to other external unit.

As shown in FIG. 13, in the operating state of this shift valve 17a, the pressure oil introduced from the out let port 60b of the linear solenoid valve 14a is supplied to an oil pressure actuating portion of an another clutch (not shown) which is connected to predetermined other output port 22 (see FIG. 2) via the valve element 88 of the shift valve 17a, and another clutch becomes engaged state.

As described above, in this embodiment, the line pressure introduced from a predetermined input port 21 (see FIG. 2) is regulated to a desired pressure in a state where the body 12 is provided with the linear solenoid valve 14a, the three-way valve 16a, the shift valve 17a, and the accumulator 18a, etc., and the precisely regulated pressure oil can be supplied to the automatic transmission 100 from the predetermined output port 22 (see FIG. 2).

Here, regulation of output of the pressure oil delivered from the output port 22 of the input-output port portion 20 of the solenoid valve device 10 will be explained.

In addition, regulation of the output of the pressure oil can be performed by the solenoid valve device 10 on a stand-alone basis before the solenoid valve device 10 is attached to the automatic transmission 100.

Specifically, regulation of the output of the pressure oil is performed by supplying a predetermined current to the linear solenoid portion 30 of the linear solenoid valves 14a-14d and measuring the pressure of the pressure oil which is output from the output port 22, while supplying a predetermined line pressure to the input port 21 of the input-output port portion 20 of the solenoid valve device 10. At this time, the same line pressure may be supplied for each of the input ports 21, or a pressure corresponding to the structure of the automatic transmission 100 may be supplied to each input port 21.

As described above, when the predetermined current is supplied to the linear solenoid portion 30, the spool 28 is operated by an electromagnetic thrust which is proportional to a current passing through the coil 52, and the line pressure is output from the inlet port 60a to the out let port 60b. Also, the pressure oil which is output from the out let port 60b is output from the shift valve 17a through the oil path R1, or output from the output port 22 of the input-output port portion 20 through the accumulator 18a.

Also, the pressure of the pressure oil which is output from the predetermined output port 22 is measured, and the pushed length of the blocking member 64 which is provided in the corresponding linear solenoid valve 14a (14b-14d) is regulated. After that, when the pressure of the pressure oil becomes the predetermined pressure, regulation of the pushed length of the blocking member 64 is finished.

As described above, by regulating the pushed length of the blocking member 64, not only the pressure of the pressure oil which is output from the linear solenoid valve 14a, but also the pressure of the pressure oil which is output through the shift valve 17a and the accumulator 18a which are connected to the side of the out let port 60b of the linear solenoid valve 14a can be regulated, and a final pressure of the pressure oil which is finally supplied from the solenoid valve device 10 to the automatic transmission 100 can be regulated directly.

Such regulation is made to each of the linear solenoid valves 14a-14d. For this reason, the final pressure of the pressure oil which is output from each of the output port 22 can be regulated directly, and high-precision regulation of the pressure can be performed.

As described above, according to the solenoid valve device 10 of this embodiment, because the solenoid valve device 10 is composed of the upper body 12a on which the plurality of linear solenoid valves 14a-14d are attached to one side surface 22a and the plurality of three-way valves 16a-16c are attached to other side surface 22b as various kinds of valve; the plurality of shift valves 17a and 17b; and the lower body 12b which is provided with the plurality of accumulators 18a-18c and the input-output port portion 20 in which each of the components is unitized, circulation of the pressure oil is enhanced, operational responsibility of each valve is enhanced, and assembling of parts is enhanced.

Also, according to this solenoid valve device 10, the plurality of linear solenoid valves 14a-14d, the plurality of three-way valves 16a-16c, the plurality of shift valves 17a and 17b, the plurality of accumulators 18a-18c, and the input-output port portion 20 can be intensively mounted on the upper body 12a and the lower body 12b, the output pressure of the output oil output from this solenoid valve device 10 can be output as the final output pressure supplied to the automatic transmission 100.

Therefore, in the solenoid valve device 10, regulation and management of the final pressure of the pressure oil supplied to the automatic transmission 100 can be performed, and an advantage that regulation and management of the final output pressure can be performed easily is obtained.

In addition, because the pressure oil output from the solenoid valve device 10 can be directly supplied to the automatic transmission 100, the pressure of the pressure oil can be regulated with high precision, and the automatic transmission 100 can be controlled with high precision.

Also, because components (e.g., the linear solenoid valves 14a-14d, etc.) to output the final pressure to the automatic transmission 100 are intensively provided in the solenoid valve device 10, there is no need to provide these components in the automatic transmission 100. Also, there is no need to provide the oil path, etc., to connect these components is the automatic transmission 100. Therefore, the structure of the automatic transmission 100 can be simplified. Further, because there is no need to form the oil path which connects the components on the side wall 101, etc., of the automatic transmission 100, the structure of the side wall 101 can be simplified and the side wall 101 can be made to be thinner. For this reason, the cost can be lowered.

Also, because the oil path R1 formed on the upper body 12a is made to be exposed on the bottom surface of the upper body 12a, the oil path R1 can be formed easily from the bottom surface of the upper body 12a. Likewise, because the oil path R2 formed on the lower body 12b is made to be exposed on the top surface of the lower body 12b, the oil path R2 can be formed easily from the top surface of the lower body 12b.

Further, because the oil path R1 and the oil path R2 are placed at a mating face between the upper body 12a and the lower body 12b, the upper body 12a can easily communicates with the lower body 12b, and the oil path R1 can easily communicates with the oil path R2 as needed by merely interposing the intermediate plate 12c. For this reason, the layout of the oil paths R1 and R2 can be easily performed, and have a high degree of flexibility in design.

Also, because the plurality of linear solenoid valves 14a-14d are provided with blocking members 64 to regulate pressures of the pressure oil respectively and the blocking members 64 can regulate the final pressures of the pressure oil which is supplied to the automatic transmission 100 through the output ports 22, the final pressures of the pressure oil which is supplied to the automatic transmission 100 through the outputs port 22 can be regulated respectively by regulating the blocking members 64 which are provided in the plurality of linear solenoid valves 14a-14d. Therefore, an advantage that regulation and management of the final pressure can be performed easily is obtained.

In addition, the pressures of the pressure oil supplied to the automatic transmission 100 can be regulated with high precision by regulating the blocking members 64 respectively, thereby controlling the automatic transmission 100 with high precision using the solenoid valve device 10.

Also, because the ribs 19 are formed on the external wall of the projecting portion 18A, which encloses the accumulators 18a-18c, along the projecting direction of the projecting portion 18A, the stiffness of the projecting portion 18A having the accumulators 18a-18c can be ensured, and the accumulators 18a-18c having capacities can be preferably provided.

Also, in this embodiment, because the solenoid valve device 10 can be attached to the automatic transmission 100 so that the projecting portion 18A is fitted within the automatic transmission 100, projecting portions on the automatic transmission 100 are reduced and the space around the automatic transmission 100 in the engine compartment can be saved. As a result, flexibility in layout can be increased.

Also, because a part of an outside of the shaft 58 is immersed in the oil W stored in the breathing chamber 60e and the opening of the breathing port 60d communicates with the inside of the breathing chamber 60e at the place which is vertically above a liquid level W1 of the oil W, the part of the outside of the shaft 58 is almost always immersed in the oil W stored in the breathing chamber 60e and the oil W can be supplied to the linear solenoid portion 30 through the shaft 58. For this reason, the linear solenoid portion 30 can preferably slide using the oil W, and slidability in the linear solenoid portion 30 can be enhanced. For this reason, the solenoid valve device 10 in which the output pressure can be controlled with high precision can be obtained.

Also, because the shaft 58 is supported by the bearing 35 in the linear solenoid portion 30, the advantage of high slidability can be obtained.

Also, because the bearing 35 can preferably slide using the oil W supplied to the linear solenoid portion 30 through the shaft 58, slidability in the linear solenoid portion 30 is enhanced.

Also, the grooves 35a are formed on the circumferential surface of the bearing 35 in the axial direction of the shaft 58, the oil W preferably flows through the grooves 35a in the axial direction of the shaft 58, and the slidability in the linear solenoid portion 30 is enhanced. This contributes to keeping the slidability in the linear solenoid portion 30 for a long term.

While a preferred embodiment according to the present invention has been described, the present invention is not limited thereto and variations may be made without departing from the sprit of the invention.

For example, although the line pressure which is introduced from the predetermined input port 21 is delivered to the linear solenoid valve 14a and the three-way valve 16a in the oil hydraulic circuit 110 shown in FIGS. 12 and 13, the present invention is not limited thereto. The line pressure which is introduced from other input port 21 than the predetermined one may be regulated to a desired pressure at other linear solenoid valve 14b (14c, 14d), and may be directly delivered from the other linear solenoid valve 14b (14c, 14d) to an oil pressure actuating portion of other clutch without passing through the three-way valves 16a-16c and the shift valves 17a and 17b.

Also, although the oil W is introduced in the breathing chamber 60e from the drain port 60c through the gap 29, the present invention is not limited thereto. The oil W may be supplied through other flow path.

What is claimed is:

1. A solenoid valve device, comprising:
an integrated body, the integrated body comprises an upper body and a lower body;
a plurality of valves; and
an intermediate plate interposed between the upper body and the lower body,
wherein a plurality of linear solenoid valves are attached as the valves to a side surface of the upper body, a plurality of directional control valves are attached to another side surface opposite to the side surface, and wherein the lower body is provided with a plurality of shift valves as the valves for shifting a flow of an output fluid output from the plurality of linear solenoid valves, and the lower body is further provided with a plurality of accumulators and a input-output port portion through which a plurality of input and output ports are provided.

2. The solenoid valve device according to claim 1, wherein each of the plurality of linear solenoid valves is provides with a pressure regulating portion for regulating the output pressure of the output fluid, and
the pressure regulating portion regulates the final output pressure of the output fluid supplied to the external unit through the output port.

3. The solenoid valve device according to claim 1, wherein the accumulator is provided in a projecting portion projected from the lower body, and ribs are formed on an external wall of the projecting portion in the direction of the projecting portion.

4. The solenoid valve device according to claim 2, wherein the accumulator is provided in a projecting portion projected from the lower body, and ribs are formed on an external wall of the projecting portion in the direction of the projecting portion.

5. The solenoid valve device according to claim 1, wherein the linear solenoid valve comprises:
   a linear solenoid portion which is made to slide along an axial portion by exciting a coil;
   a valve body in which a spool is embedded, the spool can slide while the axial portion slides;
   a chamber which is provided in the valve body, is adjacent to the linear solenoid portion, encloses the axial portion, and into which a fluid flows to be stored; and
   a port which is provided through the chamber so as to discharge the fluid stored in the chamber,
   wherein a part of the axial portion is immersed in the fluid stored in the chamber, and an opening of the port communicates with an inside of the chamber at a place which is vertically above a liquid level of the fluid.

6. The solenoid valve device according to claim 5, wherein the axial portion is slidably supported by a bearing in the linear solenoid portion.

7. The solenoid valve device according to claim 6, wherein grooves are formed on a circumferential surface of the bearing in an axial direction of the axial portion.

* * * * *